United States Patent
Balboul et al.

(10) Patent No.: US 11,647,403 B2
(45) Date of Patent: May 9, 2023

(54) CLOSED LOOP ENVIRONMENT SENSING AND CONTROL FOR WIRELESS APPLICATIONS

(71) Applicant: GM GLOBAL TECHNOLOGY OPERATIONS LLC, Detroit, MI (US)

(72) Inventors: Ahmad S. Balboul, Beverly Hills, MI (US); Bhargavi Chandrakumar, Clinton Township, MI (US); Lakshmi V. Thanayankizil, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 208 days.

(21) Appl. No.: 17/158,712

(22) Filed: Jan. 26, 2021

(65) Prior Publication Data
US 2022/0240104 A1 Jul. 28, 2022

(51) Int. Cl.
*H04W 24/02* (2009.01)
*H04W 4/40* (2018.01)
(Continued)

(52) U.S. Cl.
CPC .......... *H04W 24/02* (2013.01); *H04B 17/318* (2015.01); *H04W 4/40* (2018.02); *H04W 4/48* (2018.02); *H04W 84/12* (2013.01)

(58) Field of Classification Search
CPC ...... H04B 17/318; H04B 17/327; H04B 1/74; H04L 41/0823; H04L 41/0654;
(Continued)

(56) References Cited

U.S. PATENT DOCUMENTS 7,506,540 B1 * 3/2009 Job ..................... B60C 23/0416
340/447
10,914,485 B2 * 2/2021 Yoon ..................... F24F 1/0003
(Continued)

FOREIGN PATENT DOCUMENTS

CN 106559125 A * 4/2017 ........... H01Q 3/2611
CN 112770300 A * 5/2021
(Continued)

OTHER PUBLICATIONS

Lin, Jin-Quan. Method for Solving WiFi Channel Interference and Related Product. China Patent Document No. 110062405 B, translated by Clarivate Analytics. China, Sep. 14, 2021. (Year: 2021).*
(Continued)

*Primary Examiner* — Thomas R Cairns
(74) *Attorney, Agent, or Firm* — Lorenz & Kopf LLP (57) ABSTRACT

Methods, systems and vehicles are provided for controlling a wireless application provided to a wireless device over a wireless network. One or more radio frequency (RF) parameters of the wireless device in the wireless network are triggered by the wireless application. One or more sensors generate sensor data of the wireless device in the wireless network. A processor at least facilitates determining whether an adjustment is appropriate for the wireless device in the wireless device to mitigate interference from wireless signals outside the wireless network, based on the sensor data, wherein the determination as to whether an adjustment is appropriate is based at least on part on whether the wireless application is being utilized for the wireless device in the wireless network; and adjusting, via instructions provided by the processor, a sensitivity of a receiver of the wireless device, based on the determination that the adjustment is appropriate.

18 Claims, 6 Drawing Sheets

(51) Int. Cl.
*H04B 17/318* (2015.01)
*H04W 4/48* (2018.01)
*H04W 84/12* (2009.01)

(58) Field of Classification Search
CPC .. H04L 41/145; H04L 43/00; H04W 4/40–48; H04W 16/18; H04W 24/02; H04W 36/0083; H04W 84/12; H04W 88/18; H04W 4/38; H04W 8/30; H04W 24/08
See application file for complete search history.

(56) References Cited

U.S. PATENT DOCUMENTS

| | | | |
|---|---|---|---|
| 2007/0046447 A1* | 3/2007 | Conner | B60C 23/0462 340/447 |
| 2019/0014543 A1* | 1/2019 | Vare | H04W 52/60 |

FOREIGN PATENT DOCUMENTS

| | | | | |
|---|---|---|---|---|
| CN | 110062405 B | * | 9/2021 | ............ H04B 17/318 |
| DE | 19852454 B4 | * | 11/2005 | ............ H04B 1/1081 |
| GB | 2292654 A | * | 2/1996 | ............ G01S 5/0009 |
| WO | WO-2020175441 A1 | * | 9/2020 | ............... G06F 1/20 |

OTHER PUBLICATIONS

Huang, Ya-Xue. Wireless Communication Device. China Patent Document No. 112770300 A, translated by Clarivate Analytics. China, May 7, 2021. (Year: 2021).*
Gerhaeuser et al.. Apparatus And Method For Improving Radio Transmission Over A Radio Link Between A Transmitter And A Receiver. Germany Patent Document No. 19852454 B4, translated by Clarivate Analytics. China, Nov. 10, 2005. (Year: 2005).*
Flynn et al. Adaptive Antenna Selection For Interference Mitigation. China Patent Document No. 106559125 A, translated by Clarivate Analytics. China, Apr. 5, 2017. (Year: 2017).*
Houghtlen, Marci. "Here's How WiFi Hotspots Work in Cars," MotorBiscuit, Sep. 15, 2019, https://www.motorbiscuit.com/heres-how-wifi-hotspots-work-in-cars/ (accessed Oct. 11, 2022). (Year: 2019).*
2020 Nissan GT-R with Nissan Connect Services. https://www.nissausa.com/connect/system-availability.28859.html (accessed Oct. 11, 2022). (Year: 2020).*
2020 Nissan NV200 Compact with Nissan Connect Services. https://www.nissausa.com/connect/system-availability.28921.html (accessed Oct. 11, 2022). (Year: 2020).*
2020 Nissan NV Cargo with Nissan Connect Services. https://www.nissausa.com/connect/system-availability.28887.html (accessed Oct. 11, 2022). (Year: 2020).*
2020 Nissan NV Passenger with Nissan Connect Services. https://www.nissausa.com/connect/system-availability.28890.html (accessed Oct. 11, 2022). (Year: 2020).*
2019 Nissan Pathfinder with Nissan Connect Services. https://www.nissausa.com/connect/system-availability.28695.html (accessed Oct. 11, 2022). (Year: 2019).*
2020 Nissan Rogue with Nissan Connect Services. https://www.nissausa.com/connect/system-availability.28866.html (accessed Oct. 11, 2022). (Year: 2020).*
2020 Nissan Rogue Sport with Nissan Connect Services. https://www.nissausa.com/connect/system-availability.28953.html (accessed Oct. 11, 2022). (Year: 2020).*
2020 Nissan Titan with Nissan Connect Services. https://www.nissausa.com/connect/system-availability.28967.html (accessed Oct. 11, 2022). (Year: 2020).*
2020 Nissan Titan XD with Nissan Connect Services. https://www.nissausa.com/connect/system-availability.28966.html (accessed Oct. 11, 2022). (Year: 2020).*
2020 Nissan Versa with Nissan Connect Services. https://www.nissausa.com/connect/system-availability.28862.html (accessed Oct. 11, 2022). (Year: 2020).*
Anders, David, "Travel with Wi-Fi: How to get Wi-Fi in your car (and is it worth it?)," allconnect, Jun. 18, 2019, https://www.allconnect.com/blog/wifi-in-cars (accessed Oct. 11, 2022) (Year: 2019).*
Jones, Peter. "11 Popular Cars With Built-In Wi-Fi Hotspot (With Picture)." Motor and Wheels, Jan. 18, 2021, https://motorandwheels.com/popular-cars-with-built-in-wi-fi-hotspot/(accessed Oct. 11, 2022). (Year: 2021).*
Laukkonen, Jeremy. "How to Get Wi-Fi in Your Car," Lifewire, Dec. 28, 2020, https://www.lifewire.com/get-wifi-in-your-car-404754 (accessed Oct. 11, 2022). (Year: 2020).*
Hearst Auto Research. "Cars with Wi-Fi: Everything You Need to Know," Car and Driver, Jun. 10, 2020, https://www.caranddriver.com/research/a32814112/cars-with-wifi/ (accessed Oct. 11, 2022) (Year: 2020).*

* cited by examiner

CLOSED LOOP ENVIRONMENT SENSING AND CONTROL FOR WIRELESS APPLICATIONS

TECHNICAL FIELD

The technical field generally relates to wireless applications, and more particularly relates to closed loop environment sensing and control for wireless applications, such as in vehicles.

BACKGROUND

Wireless networks, such as wireless local area network (WLAN) is commonly based on IEEE 802.11 standard and Wi-Fi is the most popular marketed brand Short Range Wireless Networks (SRWN), often include local networking of one or more wireless applications, which can potentially receive interference from one or more outside signals. This may occur, for example, with vehicles and/or other mobile platforms as they move from place to place. In certain situations, such interference may impact performance of the of the wireless applications.

Accordingly, it may be desirable to improve performance from such wireless applications, for example to reduce unwanted effects from such interference. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided for controlling a wireless application provided to a wireless device over a wireless network, the method including: controlling one or more radio frequency (RF) parameters of a wireless device in a wireless network triggered by a wireless application; generating, via one or more sensors, sensor data of the wireless device in the wireless network; determining, via a processor, whether an adjustment is appropriate for the wireless device in the wireless device to mitigate interference from wireless signals outside the wireless network, based on the sensor data, wherein the determination as to whether an adjustment is appropriate is based at least on part on whether the wireless application is being utilized for the wireless device in the wireless network; and adjusting, via instructions provided by the processor, a sensitivity of a receiver of the wireless device, based on the determination that the adjustment is appropriate.

Also in an exemplary embodiment, the network over which the wireless network comprises a wireless local area network (WLAN), and the wireless device comprises a WLAN device using the WLAN.

Also in an exemplary embodiment, the WLAN network over which the wireless application is provided is provided within a vehicle.

Also in an exemplary embodiment, the determination as to whether an adjustment is appropriate is also based at least on part on one or more external factors outside the vehicle.

Also in an exemplary embodiment, the step of generating the sensor data comprises measuring a signal strength of the wireless network with respect to the wireless device; and the step of determining whether the adjustment is appropriate comprises determining, via the processor, whether the adjustment is appropriate based at least on part on the signal strength.

Also in an exemplary embodiment: the step of determining whether the adjustment is appropriate comprises determining, via the processor, whether the adjustment is appropriate based on whether the signal strength exceeds a predetermined threshold; and the step of adjusting the sensitivity of the receiver comprises reducing, via instructions provided by the processor, the sensitivity of the receiver when it is determined that the signal strength exceeds the predetermined threshold.

Also in an exemplary embodiment, the step of determining whether the adjustment is appropriate comprises determining, via the processor, that the adjustment is appropriate based at least in part on when the signal strength is greater than a sum of a default sensitivity level for the wireless device and a sensitivity adjustment amount for the wireless device; and the step of adjusting the sensitivity of the receiver comprises reducing, via instructions provided by the processor, the sensitivity of the receiver by the sensitivity adjustment amount based at least in part on when it is determined that the signal strength is greater than the sum of the default sensitivity level for the wireless device and the sensitivity adjustment amount for the wireless device.

Also in an exemplary embodiment, the method further includes: determining, via the processor, whether the wireless network is operating via an access point (AP) mode; wherein the sensitivity of the receiver is adjusted only upon a further condition that the wireless network is not operating via the AP mode.

Also in an exemplary embodiment, the step of generating the sensor data comprises detecting outside wireless signals coming from outside the wireless network; wherein the step of determining whether the adjustment is appropriate comprises determining, via the processor, whether the adjustment is appropriate based at least in part on the detected outside wireless signals.

In another exemplary embodiment, a control system is provided for controlling a wireless application provided to a wireless device over a wireless network, the control system including: one or more sensors configured to generate sensor data sensor of the wireless device in the wireless network; and a processor coupled to the one or more sensors and configured to at least facilitate: controlling one or more radio frequency (RF) parameters of the wireless device in the wireless network triggered by the wireless application; determining whether an adjustment is appropriate for the wireless device in the wireless device to mitigate interference from wireless signals outside the wireless network, based on the sensor data, wherein the determination as to whether an adjustment is appropriate is based at least on part on whether the wireless application is being utilized for the wireless device in the wireless network; and adjusting a sensitivity of a receiver of the wireless device, based on the determination that the adjustment is appropriate; determining whether the wireless network is operating via an access point (AP) mode; and adjusting the sensitivity of the receiver only upon a further condition that the wireless network is not operating via the AP mode.

Also in an exemplary embodiment, the network over which the wireless network comprises a wireless local area network (WLAN), and the wireless device comprises a WLAN device using the WLAN.

Also in an exemplary embodiment, the WLAN network over which the wireless application is provided is provided within a vehicle.

Also in an exemplary embodiment, the determination as to whether an adjustment is appropriate is also based at least on part on one or more external factors outside the vehicle.

Also in an exemplary embodiment: the one or more sensors are configured to at least facilitate measuring a signal strength of the wireless network with respect to the wireless device; and the processor is configured to at least facilitate determining whether the adjustment is appropriate based at least in part on the signal strength.

Also in an exemplary embodiment, the processor is configured to at least facilitate: determining whether the adjustment is appropriate based at least in part on whether the signal strength exceeds a predetermined threshold; and providing instructions for reducing the sensitivity of the receiver when it is determined that the signal strength exceeds the predetermined threshold.

Also in an exemplary embodiment, the processor is configured to at least facilitate: determining that the adjustment is appropriate based at least in part on when the signal strength is greater than a sum of a default sensitivity level for the wireless device and a sensitivity adjustment amount for the wireless device; and providing instructions for reducing the sensitivity of the receiver by the sensitivity adjustment amount when it is determined that the signal strength is greater than the sum of the default sensitivity level for the wireless device and the sensitivity adjustment amount for the wireless device.

Also in an exemplary embodiment, the one or more sensors are configured to at least facilitate detecting outside wireless signals coming from outside the wireless network; and the processor is configured to at least facilitate determining whether the adjustment appropriate based at least in part on the detected outside wireless signals.

In a further exemplary embodiment, a vehicle is provided that includes: a body defining a cabin inside the vehicle; a wireless network for providing a wireless application to a wireless device inside the cabin; and a control system comprising: one or more sensors configured to generate sensor data sensor of the wireless device in the wireless network; and a processor coupled to the one or more sensors and configured to at least facilitate: controlling one or more radio frequency (RF) parameters of the wireless device in the wireless network triggered by the wireless application; determining whether an adjustment is appropriate for the wireless device in the wireless device to mitigate interference from wireless signals outside the wireless network, based on the sensor data, wherein the determination as to whether an adjustment is appropriate is based at least on part on whether the wireless application is being utilized for the wireless device in the wireless network; and adjusting a sensitivity of a receiver of the wireless device, based on the determination that the adjustment is appropriate.

Also in an exemplary embodiment, the wireless network comprises a wireless local area network (WLAN); the one or more sensors are configured to at least facilitate measuring a signal strength of the WLAN with respect to the wireless device; and the processor is configured to at least facilitate determining whether the adjustment is appropriate based on the signal strength.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
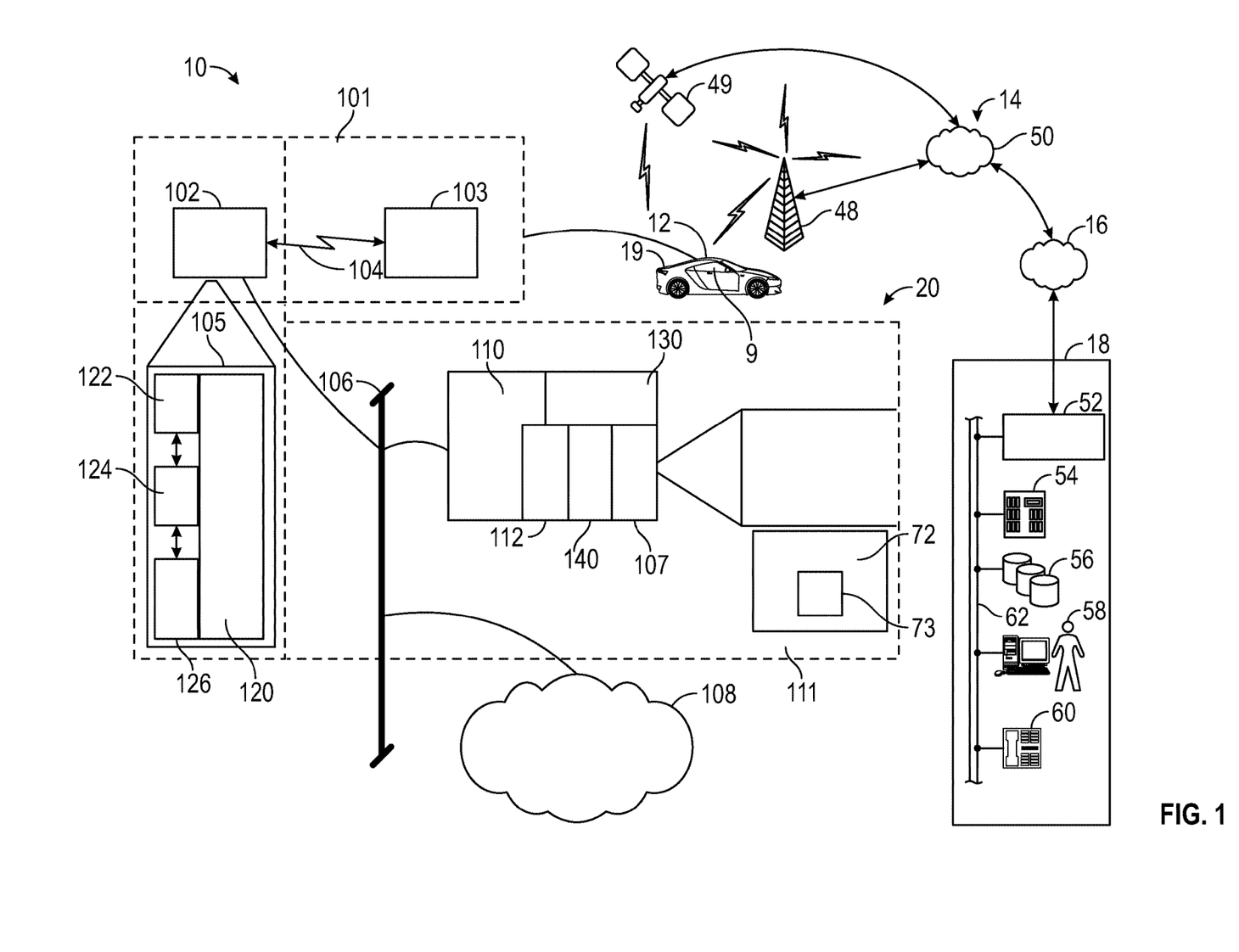
FIG. 1 is a functional block diagram of a communications system that includes a wireless network, a wireless application, and a control system for controlling the wireless application via the wireless network, in accordance with exemplary embodiments.

FIG. 1 is a functional block diagram of a communications system 10, in accordance with an exemplary embodiment. As described in further greater detail further below, the communications system 10 includes a short range wireless network 101, a telematics system 111, and a control system 112 for controlling a wireless application 107 for a wireless device 102 via the short range wireless network 101.

In various embodiments, the short range wireless network 101 comprises a wireless local area network (WLAN), wireless personal area network (WPAN), Wi-Fi network, and/or one or more other closed short range wireless networks.

Also in various embodiments, the telematics system 111 includes a main processor 110 and an upper layer wireless stack 130 that support one or more wireless applications 107. In various embodiments, the main processor 110 is part of the control system 112 (e.g., a computer system) that also includes a computer memory 140. Also in various embodiments, the wireless applications 107 may comprise a wireless phone projection (WPP) application, a vehicle hot spot application, a web browser, audio streaming, a vehicle hot spot, hands free telephone calls, telephone book (e.g., looking up the users' call history and contacts), text/voice recognition (e.g., including audio playback of the users' messages), music playback, and/or one or more other wireless applications for the wireless device 102.

In addition, in various embodiments, the wireless device 103 comprises a consumer wireless device, such as a user's (e.g., a vehicle occupant's) smart phone, computer, and/or other electronic device. Also in various embodiments, the wireless device 103 is wirelessly coupled to a short range wireless device 102 (e.g., a WLAN system device) that is integrated into a telematics system 111 (e.g., an infotainment system) of the vehicle 12, via a wireless signal 104 of the short range wireless network 101 (which, in various embodiments, corresponds to a radio frequency of the WLAN and/or other wireless network).

As depicted in FIG. 1, in various embodiments the vehicle hardware 20 further includes a transceiver 105. In various embodiments, the transceiver 105 comprises a wireless (e.g., WLAN) transceiver. Also in various embodiments, as depicted in FIG. 1, the transceiver 105 includes a lower layer wireless stack 120, a radio 122, a modem 124, and a processor 126. In various embodiments, the lower layer wireless stack 120 is supported by the main processor 110 described above.

In various embodiments, a receiver sensitivity (e.g., of the transceiver 105) is adjusted for the short range wireless network 101 with respect to the wireless application 107 under appropriate conditions, including to reduce interference of outside signals for the wireless application 107, for example as set forth in connection with the process 400 of FIG. 4.

In various embodiments, the short range wireless network 101 is a wireless component, and is a sub-system integrated into the telematics system 111 (e.g., in certain embodiments, an infotainment system of the vehicle 12). Also in various embodiments, the wireless device 102 and wireless device 103 are wirelessly connected to one another via the short range wireless network 101, which serves as the intercommunication (data exchange between the associated and connected devices) between the wireless devices 102 and 103.

In certain embodiments the performance of the wireless devices 102 and/or 103 may be affected by other wireless in-band systems and/or and other noise factors. In various embodiments, such factors may be alleviated in improving wireless application 107 performance by reducing the receiver sensitivity of the transceiver 105 (e.g., de-sense). Specifically, in various embodiments, reducing the receiver sensitivity creates a filter-like mechanism.

Figure 6:
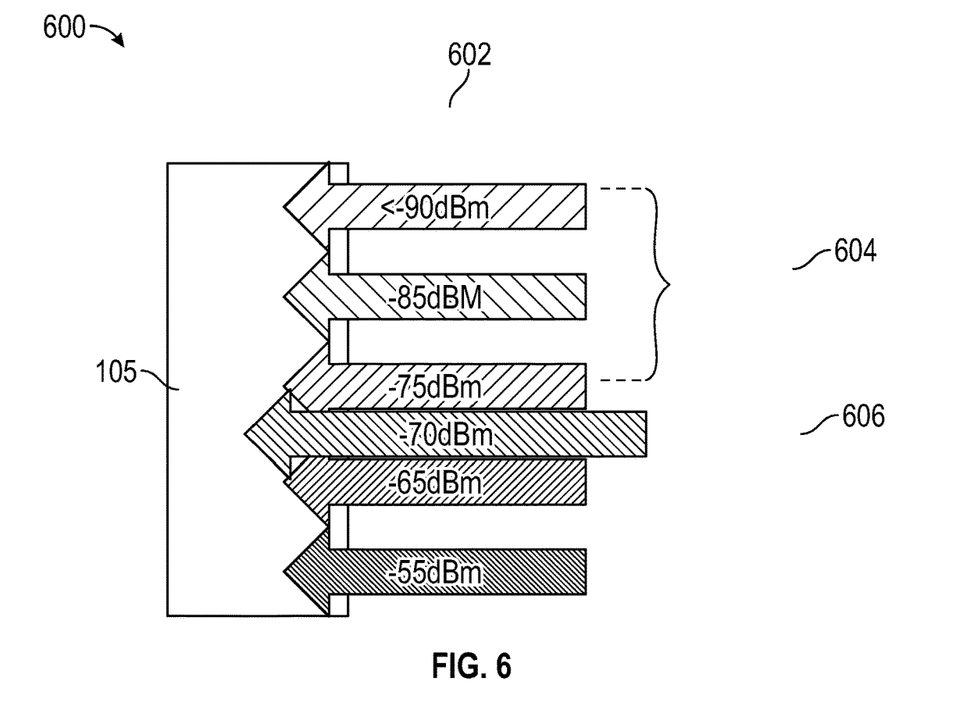
FIG. 6 is an exemplary implementation is provided depicting in-band of a transceiver of FIG. 1 without de-sensing in accordance with the process of FIG. 4, in accordance with an exemplary embodiment.

For example, with reference to FIG. 6, an exemplary implementation 600 is provided depicting in-band signals 602 of the transceiver 105 without de-sensing, in accordance with an exemplary embodiment. As shown in FIG. 6, in an exemplary embodiment, unwanted signals 604 may interfere with wanted signals 606 from the user wireless device 103 of FIG. 1.

Figure 7:
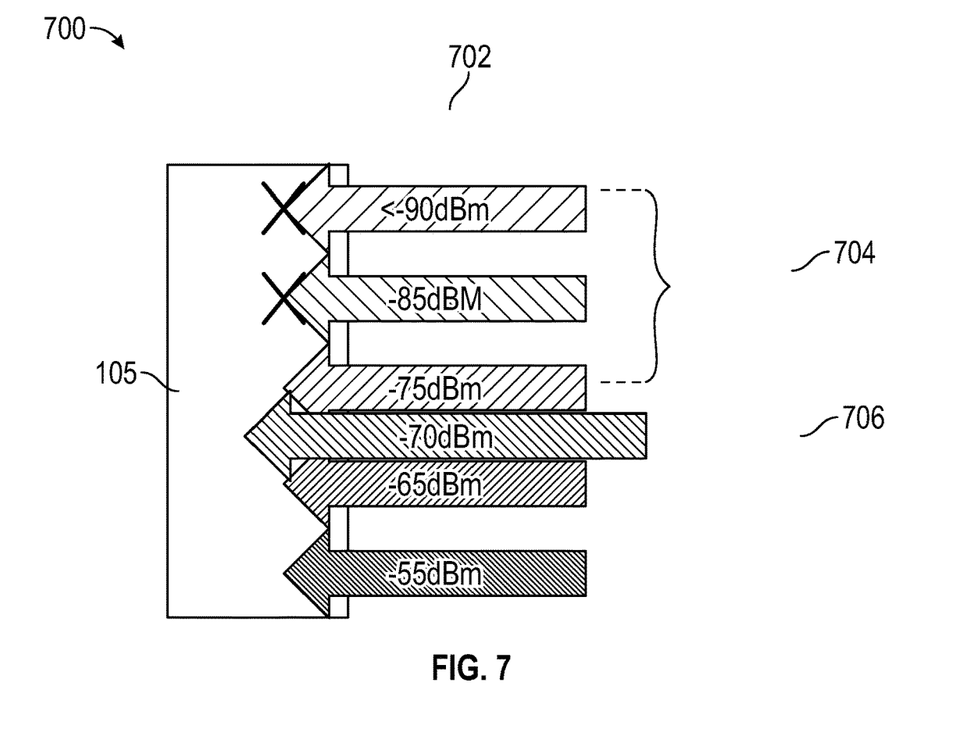
FIG. 7 is an exemplary implementation is provided depicting in-band of a transceiver of FIG. 1 with de-sensing in accordance with the process of FIG. 4, in accordance with an exemplary embodiment.

By way of further example, with reference to FIG. 7, an exemplary implementation 700 is provided depicting in-band signals 702 of the transceiver 105 with de-sensing, in accordance with an exemplary embodiment. As shown in FIG. 7, in an exemplary embodiment, with the de-sensing, unwanted signals 704 are less likely to interfere with wanted signals 706 from the user wireless device 103 of FIG. 1. For example, in various embodiments, a significant amount of unwanted signal are passed through the system, and by de-sensing in FIG. 7 the weaker signals are screened out. Thus, in various embodiments, by de-sensing, lower amount of unwanted signals are received by the receiver (e.g., of the transceiver 105), and overall noise and interference level to the system is reduced.

With reference back to FIG. 1, in certain non-limiting embodiment, the depicted embodiment, the control system 112, the wireless application 107, wireless device 103, and short range wireless network 101 are implemented in connection with a vehicle 12, and are disposed within a cabin inside a body 19 of the vehicle 12. In the depicted embodiment, the vehicle 12 comprises an automotive vehicle, or automobile.

In various embodiments, the vehicle 12 may comprise any number of other vehicles, such as automobiles, motorcycles, recreational vehicles (RVs), buses, trucks, watercraft, aircraft, spacecraft, farm equipment, and/or one or more other mobile platforms, and is equipped with suitable hardware and software that enables it to communicate over communications system 10. In addition, in certain embodiments, the control system 112, wireless application 107, wireless device 103, and short range wireless network 101 may be implemented separate and independent from any vehicles 12 and/or other mobile platforms. Further, in various embodiments, the control system 112, the wireless application 107, the wireless device 102, and the short range wireless network 101 may be implemented in connection with any number of other applications, such as, by way of example, one or more access points (APs), base stations, and/or any number of different types of in-band signals.

As depicted in FIG. 1, communications system 10 generally also includes one or more wireless carrier systems 14, one or more land networks 16, and one or more remote servers 18. It should be appreciated that the overall architecture, setup and operation, as well as the individual components of the illustrated system are merely exemplary and that differently configured communications systems may also be utilized to implement the examples of the method disclosed herein. Thus, the following paragraphs, which provide a brief overview of the illustrated communications system 10, are not intended to be limiting.

As shown in FIG. 1, in various embodiments the vehicle hardware 20 is disposed within a cabin 9 inside the body 19 of the vehicle 12, and includes a telematics system 111. In certain embodiments, the vehicle hardware 20 may include, among other components, user interface systems 108 such as one or more microphones, speakers, audio and/or video displays, and/or buttons and/or controls connected to the telematics system 111. Also in various embodiments, operatively coupled to the telematics system (and/or in certain embodiments, an infotainment system) 111 is a network connection or vehicle bus 106. Examples of suitable network connections include a controller area network (CAN), a media-oriented system transfer (MOST), a local interconnection network (LIN), an Ethernet, and other appropriate connections such as those that conform with known ISO (International Organization for Standardization), SAE (Society of Automotive Engineers), TCP/IP models, and/or IEEE (Institute of Electrical and Electronics Engineers) standards and specifications, to name a few.

In various embodiment, the telematics system 111 is an onboard device that provides a variety of services through its communication with the remote server 18, and generally includes an electronic processing device (processor) 110, one or more types of electronic memory 40, and/or various other components such as a cellular chipset/component, a wireless modem, one or more antennas, and/or a navigation unit containing a GPS chipset/component. It will be appreciated that in various embodiments one or more of these components, and/or other components of the vehicle 12 and/or the communications system 10, may be part of and/or may be coupled to the control system 112 and/or the short range wireless network 101.

In various embodiments, the telematics system 111 can be an embedded/installed within the vehicle 12 at the time of manufacture, or may be an aftermarket unit that is installed after manufacture of the vehicle 12. In various embodiments, the telematics system 111 enables voice and/or data communications over one or more wireless networks, including the short range wireless network 101, the wireless carrier system 14, and/or one or more other wireless networks, thereby allowing communications with the remote server 18 and/or other vehicles and/or systems. In addition, in certain embodiments, the transceiver may be stand alone and/or within the telematics system 111.

In various embodiments, the telematics system 111 may use radio transmissions to establish a voice and/or data channel with wireless carrier system 14 and/or other wireless networks so that both voice and data transmissions can be sent and received over the voice and/or data channels. In addition, in various embodiments, the telematics system 111 carries out wireless networking between the vehicle 12 and one or more other network devices, for example using one or more wireless protocols such as one or more IEEE 802.11 protocols, WiMAX, or Bluetooth.

The telematics system 111 may offer a number of different services for users of the vehicle 12, including the connection with wireless devices 103 of users of the vehicle 12. In various embodiments, the electronic devices may include, by way of example, various consumer electronic/mobile devices, such as a smart phone, a laptop, a smart wearable device, tablet computer, network computer, and/or one or more other electronic devices and/or combinations thereof.

In various embodiments, the telematics system 111 pairs/links with the one or more wireless devices 103 while connected to a wireless network, such as the short range wireless network 101, within a wireless range of the vehicle 12. In various embodiments, the telematics system 111 and each wireless device 103 exchange data (either directly and/or indirectly via the remote server 18) in order to verify that the wireless device 103 is a known device prior to the telematics system 111's connecting with (and/or sharing data with) the wireless device 103. For example, in various embodiments, the vehicle 12 sends beacons on a periodic basis that are dispersed throughout the vehicle 12 (e.g., throughout the body 19 thereof). In various embodiments, once the wireless device 103 is sufficiently close to the vehicle 12, the wireless device 103 transmits a message that it is close to the vehicle 12, and the vehicle 12 and the wireless device 103 commence communications.

Also in various embodiments, the remote server 18 may initiate and/or participate in the connection or association of the telematics system 111 and the wireless device 103, for example by obtaining a unique identifier of the wireless device 103 and/or verifying the owner or user of the wireless device 103 as being the same as and/or associated with an owner or user of the vehicle 12.

In various embodiments, one or more short-range wireless connection (SRWC) protocols (e.g., Bluetooth/Bluetooth Low Energy, or Wi-Fi) may be utilized for the short range wireless network 101. In various embodiments, once the SRWC is established, the wireless devices 103 may be become bonded and/or recognized as network participants for the telematics system 111, for example for current uses as well as in the future. For example, in certain embodiments, when the wireless device 103 is subsequently in wireless range with the telematics system 111 after the initial connection or association, telematics system 111 (and/or the remote server 18) may confirm that the wireless device 103 is recognized as already being paired or established as a network participant for communicating with the telematics system 111 and receiving services therefrom. In addition, as noted above and also as described in greater detail further below, in various embodiments, a receiver sensitivity of the transceiver 105 is adjusted for the short range wireless network 101 with respect to the wireless application 107 under appropriate conditions, including to reduce interference of outside signals for the wireless application 107, for example as set forth in connection with the process 400 of FIG. 4.

In various embodiments, the telematics system 111 provides various services for the recognized wireless devices 103. In various embodiments, such services may include, among other possible services, one or more wireless applications 107 such as the following: (i) wireless phone projection (WPP); (ii) web browser; (iii) audio streaming; (iv) vehicle hot spot; (v) hands free telephone calls; (vi) telephone book (e.g., looking up the users' call history and contacts); (vii) text/voice recognition (e.g., including audio playback of the users' messages), and (viii) music playback, among other possible features and services.

In various embodiments, the telematics system 111 provides connection to the recognized wireless devices 103, and services for the wireless devices 103 such as those described above, and further adjusts a receiver sensitivity for the short range wireless network 101 with respect to the wireless application 107 under appropriate conditions, including to reduce interference of outside signals for the wireless application 107, for example as set forth in connection with the process 400 of FIG. 4.

Vehicle sensors 72 are operatively connected to the vehicle bus 106. In certain embodiments, the vehicle sensors 72 may include any number of short range wireless sensors 73 for detecting and/or communicating with the wireless device 103. Other examples of vehicle sensors 72 may include, but are not limited to, gyroscopes, accelerometers, magnetometers, emission detection, and/or control sensors, and the like. Example sensor interface modules include powertrain control, climate control, and body control, to name but a few.

Wireless carrier systems 14 may be any number of cellular telephone systems, satellite-based wireless systems, and/or any other suitable wireless systems, for example that transmits signals between the vehicle hardware 20 and land network 16 (and/or, in certain embodiments, that communicate directly with the vehicle 12 and/or the remote server 18). According to certain examples, wireless carrier system 14 may include and/or be coupled to one or more cell towers 48, satellites 49, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14.

Land network 16 can be a conventional land-based telecommunications network that is connected to one or more landline telephones, and that connects wireless carrier system 14 to remote server 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Remote server 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing.

The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a remote server 18 that is manned, it will be appreciated that the remote server 18 can be any central or remote facility, manned or unmanned, mobile or fixed, to or from which it is desirable to exchange voice and data.

Figure 2:
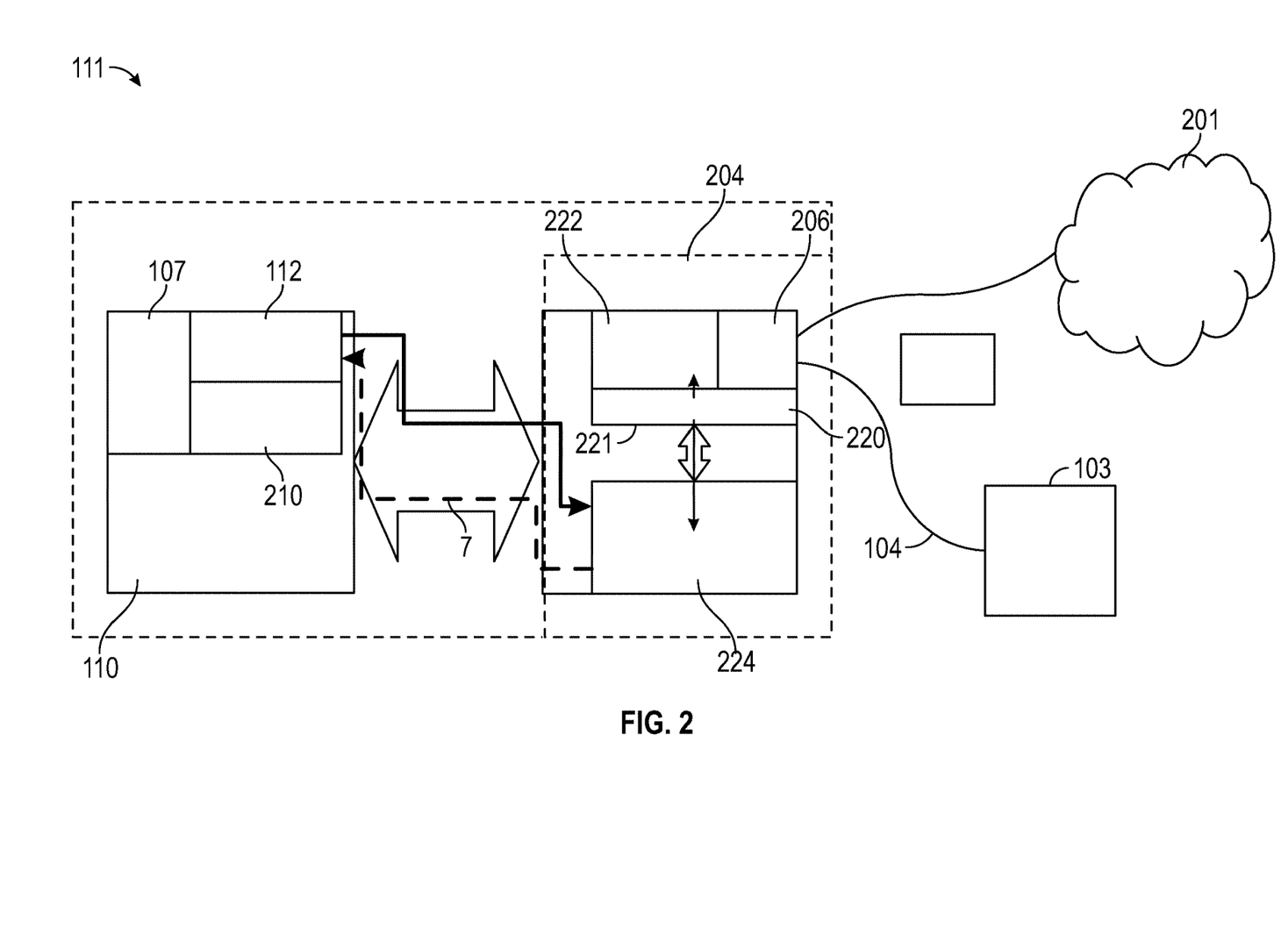
FIG. 2 is a diagram of a control system for controlling a wireless network and wireless application for an electronic device, and that can be implemented in connection with the communications system, control system, and wireless network thereof, of FIG. 1, in accordance with exemplary embodiments.

With reference to FIG. 2, a diagram is provided of a telematics system 111 with a control system 112 for controlling a wireless network 101 and wireless application 107 for a wireless device 103 via a host processor 110, in accordance with exemplary embodiments (e.g., in accordance with the respective systems and components described above in connection with FIG. 1). In various embodiments, the control system 112 is implemented in connection with the communications system 10 of FIG. 1, including the vehicle 12 thereof. Also in various embodiments, the wireless application 107 of FIG. 2 corresponds to the wireless application 107 of FIG. 1, the wireless device 103 of FIG. 2 corresponds to the wireless device 103 of FIG. 1; and the host processor 110 of FIG. 2 corresponds to the main processor 110 of FIG. 1, and so on.

As depicted in FIG. 2, in various embodiments, connected device 103 (e.g., corresponding to the user's wireless device 103 of FIG. 1) is wireless coupled to the telematics system 111 via a wireless chipset 204 (e.g., corresponding to the transceiver 105 of FIG. 1) and an antenna 206, and exhibits a radio frequency (RF) signal 104 therebetween. Also as depicted in FIG. 2, additional in-band signals may also be provided to the telematics system 111 via an external environment 201, for example by one or more other wireless systems that are external to the telematics system 111 and to the vehicle 12.

Also in various embodiments, as depicted in FIG. 2, the wireless chipset 204 includes and/or is coupled with a wireless radio 221 with radio frequency (RF) stags 222 and a wireless chipset core processor 126 (e.g., corresponding to processor 126 of FIG. 1).

In addition, in various embodiments, the wireless chipset 204 is coupled, via a communication interface 206 (e.g., a wireless network interface), to the control system 112, including the host processor 110, a wireless device driver 210, and one or more wireless applications 107 (e.g., corresponding to the wireless applications 107 of FIG. 1).

As depicted in FIG. 2, in various embodiments, the wireless application 107 is in active session with the connected device 103, and the wireless application 107 is a target application for receiver sensitivity de-sensing. Also in various embodiments, the control system 112 reads the signal strength (e.g., RSSI), for example via one or more sensors thereof of the RF signal 104 via one or more data communications (e.g., API), and determines (based at least in part thereon, via one or more processors thereof) whether de-sensing is appropriate, in accordance with the steps of the process 400 described further below in connection with FIG. 4. In addition, in various embodiments, the computer system 112 further determines (via a processor thereof) the new sensitivity level, and sends the new configuration to the wireless chipset 204 (e.g., via an API, in one exemplary embodiment). Also in various embodiments, the control system 112 comprises a closed system between the host processor 110 and the wireless device 103, as depicted in FIG. 2.

Figure 3:
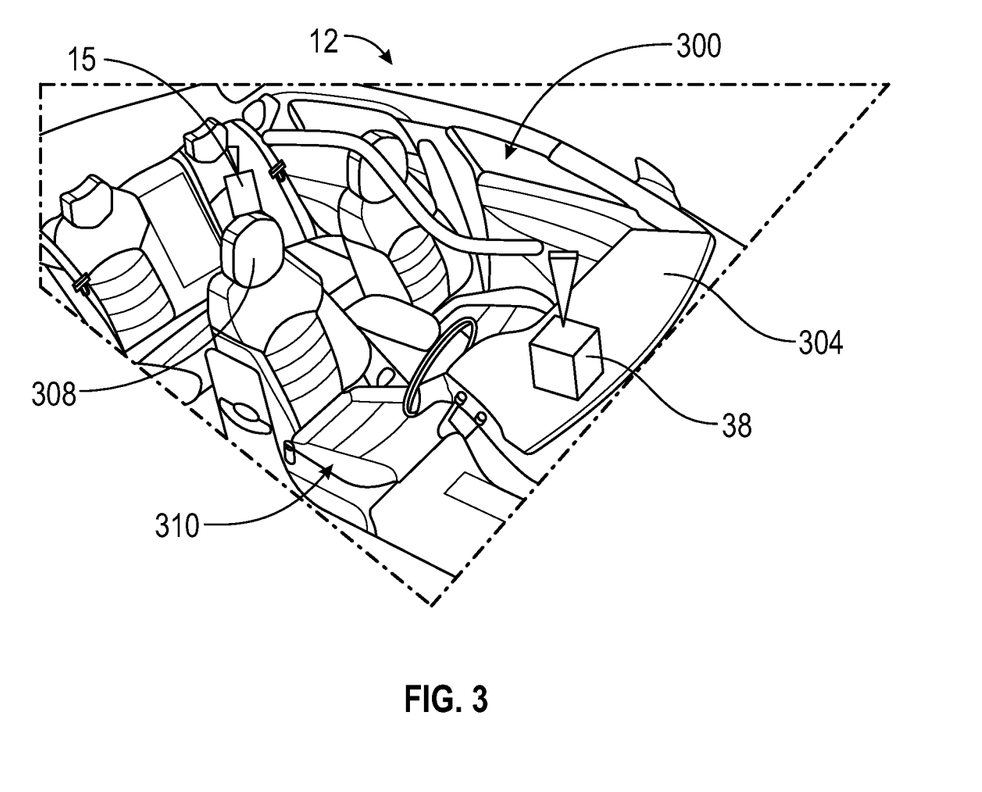
FIG. 3 is a schematic illustration of the installation of a control system for controlling a wireless network and wireless application in a vehicle, that illustrates the close proximity in which the short range wireless network is operating, and that can be used in connection with the communications system and vehicle of FIG. 1 and the control system of FIGS. 1 and 2, in accordance with exemplary embodiments.

With reference to FIG. 3, an illustration is provided with to an exemplary implementation of the control system 112 (including the host processor 110 and the wireless device 103 thereof) in a vehicle (e.g., corresponding to the vehicle 12 of FIG. 1) in accordance with an exemplary embodiment. In various embodiments, the illustration of FIG. 3 depicts the confined space of the target application. Also in various embodiments, the host processor 110 is disposed within or proximate a front console 304 of the vehicle 12 (e.g., denoted as 38 in FIG. 3); and the electronic/wireless device 102 is disposed on a headrest 308 of an occupant seat 310 (e.g., denoted as 15 in FIG. 3), all within a cabin 300 of the vehicle 12 (wherein the cabin 300 is defined by and disposed inside the body 19 of the vehicle 12 from FIG. 1, in various embodiments). However, the placement of such components may vary in other embodiments.

With reference back to FIG. 2, as depicted in FIG. 2 in various embodiments, the wireless device 103 (e.g., a smart phone and/or other electronic/wireless device) includes a wireless radio 220 that utilizes a receiver 222 with different radio frequency (RD) stages 222 coupled to and influenced by a receiver signal environment 201, and that also includes an integrated circuit 224, such as a system on chip (SoC) 224.

In addition, also as depicted in FIG. 2, in various embodiments, the host processor 110 controls and supports the wireless application 107 and a wireless device driver 210 that is utilized in connection therewith.

Moreover, also as depicted in FIG. 2, in various embodiments, the host processor 110 controls operation of the wireless application 107 for the wireless device 103 by adjusting receiver sensitivity for the wireless radio 220 under appropriate circumstances, in order to alleviate or reduce potential interference from the receiver signal environment.

In various embodiments, the host processor 110 effectively utilizes two different approaches for the short range wireless network (or communication interface) 101 of FIG. 1 between the host processor 110 and the wireless device 103 in providing the wireless application 107, namely: (i) a first data path 204 with a relatively higher signal strength for the wireless radio 220 (e.g., when there is little or no interference from the receiver signal environment 201); and (ii) a second data path 206 with a relatively lower signal sensitivity for the wireless radio 220 (e.g., when there is significant interference from the receiver signal environment 201).

In various embodiments, the radio frequency (RF) signal containing the data received via 206 antenna into 222 RF Stages (e.g., including any of the following: RF Front End, Mixer/LO,IF, baseband, and so on) is part of is part of 220. Also in various embodiments, the signal strength from 104 is higher than 204 receiver sensitivity level typically defined in dBm and in some other unit representation. The received signal strength value information is passed onto the processor 110 via communication interface 7. In various embodiments, the processor 110 determines what application 107 is in session with 103 and if application 107 is designated for de-sensing then the control system 112 determines if de-sensing is appropriate. If so, the control system 112 will send new received signal strength configuration setting level via 206 to 204. Then the control system 112 will set the new appropriate configuration level at 220 and or 222 to reject as much of signals from the environment 201.

Figure 4:
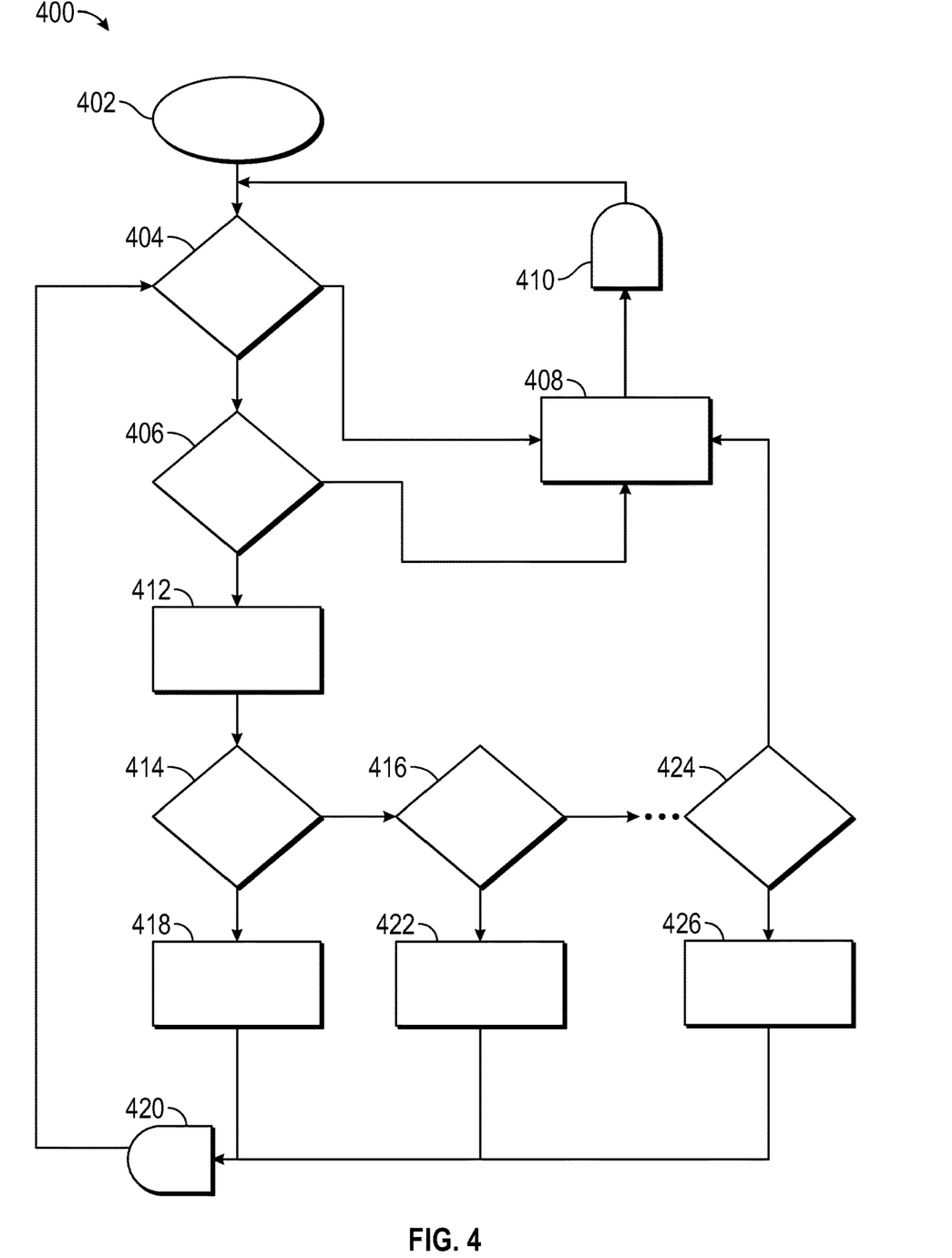
FIG. 4 is a flowchart of a process for controlling a wireless network and wireless application, and that can be implemented in connection with the communications system of FIG. 1 and the control system of FIGS. 1-3, in accordance with exemplary embodiments.

FIG. 4 is a flowchart of a process 400 for controlling a wireless network and wireless application, and that can be implemented in connection with the communications system 10 of FIG. 1 and the control system 112 of FIGS. 1-3, in accordance with exemplary embodiments.

As depicted in FIG. 4, in various embodiments the process 400 begins at step 402. In certain embodiments, the process 400 begins when a wireless device 103 is detected in proximity to the vehicle 12, and/or when one or more users of the vehicle 12 approaches or enters the vehicle 12, or turns on the vehicle 12 and/or an ignition therefor (e.g. by turning a key, engaging a keyfob or start button, and so on). In certain embodiments, the steps of the process 400 are performed continuously during operation of the vehicle 12. In certain other embodiments, the process 400 may begin when a wireless device 103 is utilized with respect to a use or requested use of a wireless application 107, regardless of whether a vehicle 12 is utilized.

In various embodiments, a determination is made at 404 as to whether a wireless device is connected. Specifically, in certain embodiments, the processor 110 of FIGS. 1 and 2 determines whether the wireless device 103 is connected to a shot range wireless network 101 of FIGS. 1 and 2 (e.g., a WLAN network, WiFi network, or other wireless network in various embodiments), based on sensor data from one or more short range wireless sensors 73. In certain embodiments, this occurs within a vehicle or other mobile, such as the vehicle 12 of FIG. 1. In certain other embodiments, this may occur separate and/or or independent from any vehicle or other mobile platform.

In various embodiments, if it is determined at 404 that the wireless device is not connected, then receiver RF sensitivity is set to its default settings at step 408. In various embodiments, a receiver RF sensitivity of the transceiver 105 of FIG. 1 is set to its default settings by the processor 110 of FIG. 1.

During step 416, the default settings are maintained for the wireless radio 220 based on the signal strength coming from the wireless device 103, and the wireless application 107 is provided for the wireless device 103 via the short range wireless network 101 using the default settings. In various embodiments, this is performed via instructions provided by the processor 110. Also in various embodiments, the default settings are maintained because the signal strength would be deemed to be too low if the sensitivity were adjusted by the sensitivity adjustment.

Also in various embodiments, following step 408, a timer is initiated at step 410. In various embodiments, during step 410, the timer is initiated by the processor 110 for a predetermined amount of time. In one embodiment, the predetermined amount of time is equal to approximately one hundred milliseconds (100 ms); however, this may vary in other embodiments. In various embodiments, after the predetermined amount of time, the process returns to step 404, as the processor 110 checks again as to whether the wireless device 103 is connected.

In various embodiments, once it is determined in an iteration of step 404 that the wireless device is connected, a determination is made during step 406 as to whether the intended wireless application (e.g., corresponding to the wireless application 107 of FIG. 1) is active. In certain embodiments, a determination may also be made as to whether the short range wireless network (or module) is operating in an access point ("AP") mode and/or a station (STA) mode. In various embodiments, these determinations are made by the processor 110 with respect to the short range wireless network 101.

In various embodiments if it is determined that the wireless application is not active, then the process proceeds to the above-referenced step 408, in which the RF receiver sensitivity is set equal to its default settings. In addition, in certain embodiments, the process similarly proceeds to the above-referenced step 408 if the short range wireless network is operating in an AP mode.

Conversely, if it is determined that the wireless application is active, then the process proceeds instead to step 412, described below. In addition, in certain embodiments, the proceeds to step 412 also based on a further condition that the wireless network is not operating in an AP mode.

During step 412, the signal strength 104 is measured at 220 from device 103. In various embodiments, the signal strength is measured with respect to the short range wireless network 101 by one or more short range wireless sensors 73 and/or determined by the processor 110 based on sensor data therefrom. In various embodiments, the process then proceeds to step 414, described below.

During step 414, a determination is made as to whether a first adjustment of the sensitivity of the wireless system is appropriate. In various embodiments, the processor 110 determines whether a first adjustment of the sensitivity of the wireless radio 220 of FIG. 2 of the wireless device 102 is appropriate to help reduce static and/or interference from outside signals, such as from external noise from other short range wireless networks and/or devices (e.g., congestion) and/or from external interference from wireless protocol jammers (e.g., denial of service attack), based on the signal strength between the short range wireless network 101 and the wireless device 103 as measured or determined in step 412.

In certain embodiments, during step 414, a first adjustment of the sensitivity is deemed to be appropriate when the signal strength of step 412 (represented as "SS" below) is greater than the sum of (i) a default sensitivity level ("$dR_x$") for the wireless device 103; (ii) a production control error ("E") and (iii) a first sensitivity adjustment ("$Y_1$") for the wireless device 103, in accordance with the following equation:

$$SS > dR_x + E + Y_1, \qquad \text{(Equation 1)}$$

Specifically, in various embodiments, the first sensitivity adjustment "$Y_1$" represents a first level or magnitude of downward adjustment of sensitivity for the receiver of the wireless radio 220 of FIG. 2 that is generally expected to significantly reduce outside noise and interference while still maintaining sufficient sensitivity for desire performance of the wireless application 107 on the wireless device 103 using the short range wireless network 101. In certain embodiments, the first sensitivity adjustment "$Y_1$" is equal to approximately ten decibels (10 dB); however, this may vary in other embodiments.

In various embodiments, if it is determined in step 414 that a first adjustment of sensitivity is not appropriate, then the process proceeds to step 416, described further below.

Conversely, in various embodiments, if it is instead determined in step 414 that a first adjustment of sensitivity is appropriate, then the process proceeds instead to step 418, described directly below.

During step 418, in various embodiments, the default settings of the wireless radio 220 of the wireless device 103 are adjusted by reducing the receiver sensitivity in the amount of the first sensitivity adjustment "$Y_1$" from Equation 1. In various embodiments, the receiver sensitivity is reduced by approximately ten decibels (10 dB); however, this may vary in other embodiments. In various embodiments, this is performed via instructions provided by the processor 110. Also in various embodiments, the default settings are adjusted by the first sensitivity adjustment "$Y_1$" because the signal strength is deemed high enough so that the wireless application 107 may continue to be provided for the user via the wireless device 103 and the short range wireless network 101. In various embodiments, during step 416, the processor 110 provides instructions for the wireless application 107 to be provided via the wireless device 103 with a relatively lower signal sensitivity for the wireless radio 220 (as compared with the default level).

In various embodiments, following step 418, a delay timer is initiated at step 420. In various embodiments, the timer of step 420 functions the same or similar as the above-described step 410, and the process then similarly proceeds to step 404.

With reference back to step 414, as noted above, if it is determined in step 414 that a first adjustment of sensitivity is not appropriate, then the process proceeds to step 416. During step 416, a determination is made as to whether a second adjustment of the sensitivity of the wireless system is appropriate. In various embodiments, the processor 110 determines whether a second adjustment of the sensitivity of the wireless radio 220 of FIG. 2 of the wireless device 103 is appropriate to help reduce static and/or interference from outside signals, such as from external noise from other short range wireless networks and/or devices (e.g., congestion) and/or from external interference from wireless protocol jammers (e.g., denial of service attack), based on the signal strength between the short range wireless network 101 and the wireless device 103 as measured or determined in step 412.

In various embodiments, during step 416, a second adjustment of the sensitivity is deemed to be appropriate when the signal strength of step 412 (represented as "SS" below) is greater than the sum of (i) a default sensitivity level ("$dR_x$") for the wireless device 103; (ii) a production control error ("E") and (iii) a second sensitivity adjustment ("$Y_2$") for the wireless device 103, in accordance with the following equation:

$$SS > dR_x + E + Y_2, \quad \text{(Equation 2)}$$

Specifically, in various embodiments, the second sensitivity adjustment "$Y_2$" represents a second level or magnitude of downward adjustment of sensitivity for the receiver of the wireless radio 220 of FIG. 2 that is generally expected to significantly reduce outside noise and interference while still maintaining sufficient sensitivity for desire performance of the wireless application 107 on the wireless device 103 using the short range wireless network 101. In various embodiments, the second sensitivity adjustment "$Y_2$" is less than the first sensitivity adjustment "$Y_1$" described above. In certain embodiments, the second sensitivity adjustment "$Y_2$" is equal to approximately seven decibels (7 dB); however, this may vary in other embodiments.

In various embodiments, if it is determined in step 416 that a second adjustment of sensitivity is not appropriate, then the process proceeds to step 424, described further below.

Conversely, in various embodiments, if it is instead determined in step 416 that a second adjustment of sensitivity is appropriate, then the process proceeds instead to step 422, described directly below.

During step 422, in various embodiments, the default settings of the wireless radio 220 of the wireless device 102 are adjusted by reducing the receiver sensitivity in the amount of the second sensitivity adjustment "$Y_2$" from Equation 2. In various embodiments, the receiver sensitivity is reduced by approximately seven decibels (7 dB); however, this may vary in other embodiments. In various embodiments, this is performed via instructions provided by the processor 110. Also in various embodiments, the default settings are adjusted by the second sensitivity adjustment "$Y_2$" because the signal strength is deemed high enough so that the wireless application 107 may continue to be provided for the user via the wireless device 103 and the short range wireless network 101. In various embodiments, during step 416, the processor 110 provides instructions for the wireless application 107 to be provided via the wireless device 102 with a relatively lower signal sensitivity for the wireless radio 220 (as compared with the default level).

In various embodiments, following step 422, a delay timer is initiated at step 420. In various embodiments, the timer of step 420 functions the same or similar as the above-described step 410, and the process then similarly proceeds to step 404.

With reference back to step 416, as noted above, if it is determined in step 416 that a second adjustment of sensitivity is not appropriate, then the process proceeds to step 424. During step 424, a determination is made as to whether a third adjustment of the sensitivity of the wireless system is appropriate. In various embodiments, the processor 110 determines whether a third adjustment of the sensitivity of the wireless radio 220 of FIG. 2 of the wireless device 102 is appropriate to help reduce static and/or interference from outside signals, such as from external noise from other short range wireless networks and/or devices (e.g., congestion) and/or from external interference from wireless protocol jammers (e.g., denial of service attack), based on the signal strength between the short range wireless network 101 and the wireless device 103 as measured or determined in step 412.

In various embodiments, during step 424, a third adjustment of the sensitivity is deemed to be appropriate when the signal strength of step 412 (represented as "SS" below) is greater than the sum of (i) a default sensitivity level ("$dR_x$") for the wireless device 102; (ii) a production control error ("E") and (iii) a third sensitivity adjustment ("$Y_3$") for the wireless device 102, in accordance with the following equation:

$$SS > dR_x + E + Y_3, \quad \text{(Equation 3)}$$

Specifically, in various embodiments, the third sensitivity adjustment "$Y_3$" represents a third level or magnitude of downward adjustment of sensitivity for the receiver of the wireless radio 220 of FIG. 2 that is generally expected to significantly reduce outside noise and interference while still maintaining sufficient sensitivity for desire performance of the wireless application 107 on the wireless device 102 within the short range wireless network 101. In various embodiments, the third sensitivity adjustment "$Y_3$" is less than both the first sensitivity adjustment "$Y_1$" and the second sensitivity adjustment "$Y_2$" described above. In one embodiment, the third sensitivity adjustment "$Y_3$" is equal to approximately three decibels (3 dB). In another embodiment, the third sensitivity adjustment "$Y_3$" is equal to approximately four decibels (4 dB). However, this may vary in other embodiments.

In various embodiments, if it is determined in step 424 that a third adjustment of sensitivity is not appropriate, then the process proceeds to the above-descried step 408, in which the receiver sensitivity is set to its default settings.

Conversely, in various embodiments, if it is instead determined in step 424 that a third adjustment of sensitivity is appropriate, then the process proceeds instead to step 426, described directly below.

During step 426, in various embodiments, the default settings of the wireless radio 220 of the wireless device 102 are adjusted by reducing the receiver sensitivity in the amount of the third sensitivity adjustment "$Y_3$" from Equation 3. In various embodiments, the receiver sensitivity is reduced by approximately three or four decibels (3 dB or 4 dB); however, this may vary in other embodiments. In various embodiments, this is performed via instructions provided by the processor 110. Also in various embodiments, the default settings are adjusted by the third sensitivity adjustment "$Y_3$" because the signal strength is deemed high enough so that the wireless application 107 may continue to be provided for the user via the wireless device 102 within the short range wireless network 101. In various embodiments, during step 416, the processor 110 provides instructions for the wireless application 107 to be provided via the wireless device 102 with a relatively lower signal sensitivity for the wireless radio 220 (as compared with the default level).

In various embodiments, following step 426, a delay timer is initiated at step 420. In various embodiments, the timer of step 420 functions the same or similar as the above-described step 410, and the process then similarly proceeds to step 404.

With continued reference to step 412-424, in certain embodiments the decision as to whether to adjust the sensitivity of the receiver is based also on whether, and to what extent, outside noise and/or interference is detected. Specifically, in certain embodiments, a magnitude or amount of outside noise and/or interference is determined from sources outside the control system 112 of FIGS. 1 and 2, and the sensitivity adjustments are made by the processor 110 based also at least in part on this determination. For example, in certain embodiments, determinations in steps 412-424 are made as to both the signal strength (as discussed above), but also as to the magnitude of the detected noise and/or interference from outside the control system 112 of FIG. 2 (or, in certain embodiments, outside the vehicle 12 of FIG. 1).

Also in certain embodiments, the determinations as to the appropriateness of the sensitivity adjustment (and the adjustment itself) are made based on the detected noise and/or interference (and/or the magnitude thereof), instead of or in addition to the signal strength comparison described above. In addition, in certain embodiments, one or more of the adjustments are made provided that both conditions are satisfied, namely: (i) the signal strength is of a sufficient value; and (ii) outside noise and/or interference of at least a predetermined magnitude is detected. In certain other embodiments, the adjust may be made based either (i) on signal strength alone (e.g., as described above) or (ii) on the detected noise and/or other interference alone (e.g., in certain embodiments, the adjustment made be made automatically when sufficient noise and/or other interference is detected). In yet other embodiments, the detected presence and/or magnitude of noise and/or other interference may affect the values of "E" and/or "Y" (e.g., of "$Y_1$", "$Y_2$", and/or "$Y_3$") in Equations 1, 2, and/or 3 above, among other possible variations.

In various embodiments, a determination is made at step 418 as to whether the process is to continue. For example, in certain embodiments, the process is determined to continue if the wireless device 103 is still on, and/or if the user and/or wireless device 103 are still in the vehicle 12, and/or if the vehicle 12 is still on, or the like. In various embodiments, this determination is made by the processor 110.

If it is determined in step 418 that the process is to continue, then the process returns to step 404 in a new iteration. Conversely, if it is determined in step 418 that the process is not to continue, then the process terminates at step 420.

Figure 5:
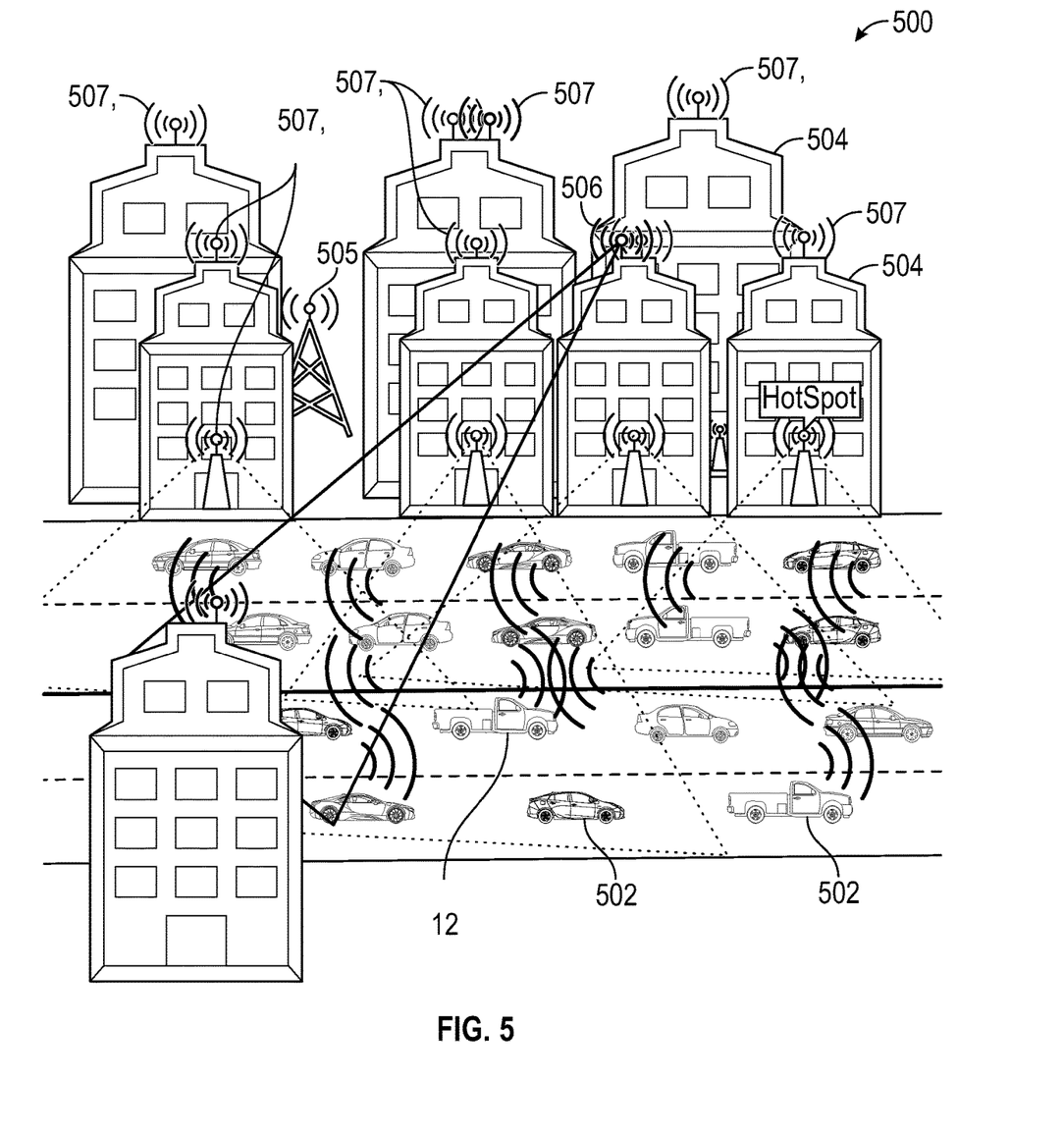
FIG. 5 is an illustration of an implementation of the process of FIG. 4, in connection with the communications system and vehicle of FIG. 1, and the control system of FIGS. 1-3, in accordance with exemplary embodiments.

FIG. 5 is an illustration of an implementation of the process 400 of FIG. 4, in connection with the communications system 10 and vehicle 12 of FIG. 1, and the control system 112 of FIGS. 1-3, in accordance with exemplary embodiments. As depicted in FIG. 5, in various embodiments, the control system 112 is implemented inside a vehicle 12, for example similar to the embodiment of FIG. 1. Also as depicted in FIG. 5, in various embodiments, the control system 112 and vehicle 12 have a surrounding environment 500 that comprises a dense environment of outside wireless signals 507. For example, in various embodiments, different vehicles 502, buildings 504, and towers 505 generate wireless signals 507, for example that may include jamming signals 506 and other wireless signals (e.g., access point (AP) or hot spot signals), creating potential noise and interference in the dense surrounding environment 500. In various embodiments, the selective adjustment of signal strength for the control system 112 of the host vehicle 12 help to reduce the adverse impact of the outside wireless signals 507 on the control system 112 inside the vehicle 12.

Accordingly, methods and systems are provided for controlling wireless networks and wireless devices. In various embodiments, the sensitivity of the receiver of the wireless device is reduced in appropriate situations, such as when the signal strength of the wireless network with respect to the wireless is sufficient to be able to handle a downward adjustment. As a result, noise and/or other interference from outside signals is reduced for the wireless network. In various embodiments, the methods and systems disclosed herein are implemented in connection with a vehicle (such as an automobile) or other mobile platform. The methods and systems may be particularly effective and well suited for such vehicle and other mobile applications, because such mobile applications necessarily face a dynamic environment in which the outside interfering signals would be constantly changing as the vehicle or other mobile platform moves.

It will be appreciated that the systems and methods may vary from those depicted in the Figures and described herein. For example, the communications system of FIG. 1, including the remote server, the vehicles, communications networks, and/or components thereof, may vary from that depicted in FIG. 1 and/or described herein, in various embodiments. It will similarly be appreciated that the control system of FIGS. 2 and 3, and/or various components thereof, may vary from the depictions in FIGS. 2 and 3 and the accompanying descriptions. It will also be appreciated that the process (and/or subprocesses) disclosed herein may differ from those described herein and/or depicted in FIG. 4, and/or that steps thereof may be performed simultaneously and/or in a different order as described herein and/or depicted in FIG. 4, among other possible variations. It will be appreciated that the implementations, for example of FIG. 5, may also vary in different embodiments.

While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof.

What is claimed is:

1. A method for controlling a wireless application provided to a wireless device over a wireless network, the method comprising:
    controlling one or more radio frequency (RF) parameters of a wireless device in a wireless network triggered by a wireless application;
    generating, via one or more sensors, sensor data of the wireless device in the wireless network;
    determining, via a processor, whether an adjustment is appropriate for the wireless device in the wireless device to mitigate interference from wireless signals outside the wireless network, based on the sensor data, wherein the determination as to whether an adjustment is appropriate is based at least in part on whether the wireless application is being utilized for the wireless device in the wireless network; and
    adjusting, via instructions provided by the processor, a sensitivity of a receiver of the wireless device, based on the determination that the adjustment is appropriate, wherein:
    the step of determining whether the adjustment is appropriate comprises determining, via the processor, that the adjustment is appropriate based at least in part on when the signal strength is greater than a sum of a default sensitivity level for the wireless device and a sensitivity adjustment amount for the wireless device; and
    the step of adjusting the sensitivity of the receiver comprises reducing, via instructions provided by the processor, the sensitivity of the receiver by the sensitivity adjustment amount based at least in part on when it is determined that the signal strength is greater than the sum of the default sensitivity level for the wireless device and the sensitivity adjustment amount for the wireless device.

2. The method of claim 1, wherein the network over which the wireless network comprises a wireless local area network (WLAN), and the wireless device comprises a WLAN device using the WLAN.

3. The method of claim 2, wherein the WLAN network over which the wireless application is provided is provided within a vehicle.

4. The method of claim 3, wherein the determination as to whether an adjustment is appropriate is also based at least in part on one or more external factors outside the vehicle.

5. The method of claim 1, wherein:
    the step of generating the sensor data comprises measuring a signal strength of the wireless network with respect to the wireless device; and
    the step of determining whether the adjustment is appropriate comprises determining, via the processor, whether the adjustment is appropriate based at least in part on the signal strength.

6. The method of claim 5, wherein:
    the step of determining whether the adjustment is appropriate comprises determining, via the processor, whether the adjustment is appropriate based on whether the signal strength exceeds a predetermined threshold; and
    the step of adjusting the sensitivity of the receiver comprises reducing, via instructions provided by the processor, the sensitivity of the receiver when it is determined that the signal strength exceeds the predetermined threshold.

7. The method of claim 1, further comprising:
    determining, via the processor, whether the wireless network is operating via an access point (AP) mode;
    wherein the sensitivity of the receiver is adjusted only upon a further condition that the wireless network is not operating via the AP mode.

8. The method of claim 1, further comprising:
    the step of generating the sensor data comprises detecting outside wireless signals coming from outside the wireless network;
    wherein the step of determining whether the adjustment is appropriate comprises determining, via the processor, whether the adjustment is appropriate based at least in part on the detected outside wireless signals.

9. A control system for controlling a wireless application provided to a wireless device over a wireless network, the control system comprising:
    one or more sensors configured to generate sensor data sensor of the wireless device in the wireless network; and
    a processor coupled to the one or more sensors and configured to at least facilitate:
        controlling one or more radio frequency (RF) parameters of the wireless device in the wireless network triggered by the wireless application;
        determining whether an adjustment is appropriate for the wireless device in the wireless device to mitigate interference from wireless signals outside the wireless network, based on the sensor data, wherein the determination as to whether an adjustment is appropriate is based at least in part on whether the wireless application is being utilized for the wireless device in the wireless network; and
        adjusting a sensitivity of a receiver of the wireless device, based on the determination that the adjustment is appropriate, and wherein the processor is configured to at least facilitate:
            determining that the adjustment is appropriate based at least in part on when the signal strength is greater than a sum of a default sensitivity level for the wireless device and a sensitivity adjustment amount for the wireless device; and providing instructions for reducing the sensitivity of the receiver by the sensitivity adjustment amount when it is determined that the signal strength is greater than the sum of the default sensitivity level for the wireless device and the sensitivity adjustment amount for the wireless device.

10. The control system of claim 9, wherein the network over which the wireless network comprises a wireless local area network (WLAN), and the wireless device comprises a WLAN device using the WLAN.

11. The control system of claim 10, wherein the WLAN network over which the wireless application is provided is provided within a vehicle.

12. The control system of claim 11, wherein the determination as to whether an adjustment is appropriate is also based at least in part on one or more external factors outside the vehicle.

13. The control system of claim 9, wherein:
the one or more sensors are configured to at least facilitate measuring a signal strength of the wireless network with respect to the wireless device; and
the processor is configured to at least facilitate determining whether the adjustment is appropriate based at least in part on the signal strength.

14. The control system of claim 13, wherein the processor is configured to at least facilitate:
determining whether the adjustment is appropriate based at least in part on whether the signal strength exceeds a predetermined threshold; and
providing instructions for reducing the sensitivity of the receiver when it is determined that the signal strength exceeds the predetermined threshold.

15. The control system of claim 9, wherein the processor is configured to at least facilitate:
determining whether the wireless network is operating via an access point (AP) mode; and
adjusting the sensitivity of the receiver only upon a further condition that the wireless network is not operating via the AP mode.

16. The control system of claim 10, wherein:
the one or more sensors are configured to at least facilitate detecting outside wireless signals coming from outside the wireless network; and
the processor is configured to at least facilitate determining whether the adjustment appropriate based at least in part on the detected outside wireless signals.

17. A vehicle comprising:
a body defining a cabin inside the vehicle;
a wireless network for providing a wireless application to a wireless device inside the cabin; and
a control system comprising:
one or more sensors configured to generate sensor data sensor of the wireless device in the wireless network; and
a processor coupled to the one or more sensors and configured to at least facilitate:
controlling one or more radio frequency (RF) parameters of the wireless device in the wireless network triggered by the wireless application;
determining whether an adjustment is appropriate for the wireless device in the wireless device to mitigate interference from wireless signals outside the wireless network, based on the sensor data, wherein the determination as to whether an adjustment is appropriate is based at least in part on whether the wireless application is being utilized for the wireless device in the wireless network; and
adjusting a sensitivity of a receiver of the wireless device, based on the determination that the adjustment is appropriate, and wherein the processor is configured to at least facilitate:
determining that the adjustment is appropriate based at least in part on when the signal strength is greater than a sum of a default sensitivity level for the wireless device and a sensitivity adjustment amount for the wireless device; and
providing instructions for reducing the sensitivity of the receiver by the sensitivity adjustment amount when it is determined that the signal strength is greater than the sum of the default sensitivity level for the wireless device and the sensitivity adjustment amount for the wireless device.

18. The vehicle of claim 17, wherein:
the wireless network comprises a wireless local area network (WLAN);
the one or more sensors are configured to at least facilitate measuring a signal strength of the WLAN with respect to the wireless device; and
the processor is configured to at least facilitate determining whether the adjustment is appropriate based on the signal strength.

\* \* \* \* \*